United States Patent
Moussa

(10) Patent No.: US 8,428,599 B2
(45) Date of Patent: Apr. 23, 2013

(54) SYSTEM AND METHOD FOR MOBILITY RESTRICTION IN WIRELESS COMMUNICATIONS SYSTEMS

(75) Inventor: Alaa-addin Moussa, Oceanside, CA (US)

(73) Assignee: FutureWei Technologies, Inc., Plano, TX (US)

( * ) Notice: Subject to any disclaimer, the term of this patent is extended or adjusted under 35 U.S.C. 154(b) by 814 days.

(21) Appl. No.: 12/495,878

(22) Filed: Jul. 1, 2009

(65) Prior Publication Data

US 2010/0002629 A1    Jan. 7, 2010

Related U.S. Application Data

(60) Provisional application No. 61/077,288, filed on Jul. 1, 2008.

(51) Int. Cl.
*H04W 36/00* (2009.01)
(52) U.S. Cl.
USPC ........... 455/437; 455/410; 455/411; 455/432; 455/453
(58) Field of Classification Search .................. 455/437, 455/411, 518
See application file for complete search history.

(56) References Cited

U.S. PATENT DOCUMENTS

| | | | |
|---|---|---|---|
| 7,308,260 B2 | 12/2007 | Mandayam et al. | |
| 7,343,158 B2 | 3/2008 | Mizell et al. | |
| 7,554,942 B2* | 6/2009 | Joong et al. | 370/328 |
| 7,602,918 B2 | 10/2009 | Mizikovsky et al. | |
| 2004/0208187 A1 | 10/2004 | Mizell et al. | |
| 2008/0139206 A1* | 6/2008 | Touray et al. | 455/437 |

OTHER PUBLICATIONS

International Search Report and the Written Opinion of the International Searching Authority, International Application No. PCT/US2009/049367, Applicant: Futurewei Technologies, Inc., Nov. 17, 2009, 9 pages.
Korean Office Action with English Translation, Applicant: Huawei Technologies Col., LTD., Patent Application No. 10-2010-7029903, Oct. 26, 2011, 7 pages.
Final Office Action with English Brief Translation received in Korean Application No. 10-2010-7029903, Dated May 29, 2012, 5 pages.

* cited by examiner

*Primary Examiner* — Wayne Cai
*Assistant Examiner* — Julio Perez
(74) *Attorney, Agent, or Firm* — Slater & Matsil, L.L.P.

(57) ABSTRACT

A system and method for mobility restriction in wireless communications systems is provided. A method for base station operations includes receiving a request for service from a terminal, sending a request for authorization of the terminal to a controller, receiving in response to the request for authorization, an indication that the terminal is authorized, and granting access to the terminal. The indication includes a mobility restriction classification associated with the terminal.

19 Claims, 3 Drawing Sheets

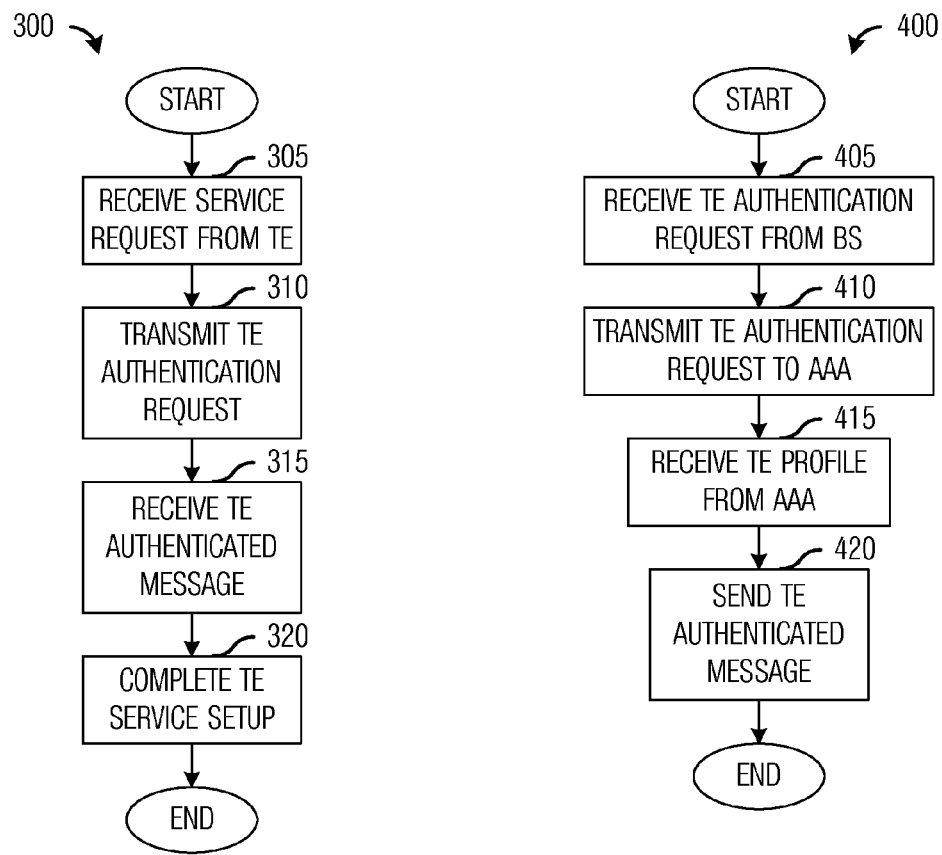
*Fig. 3*
*Fig. 4*
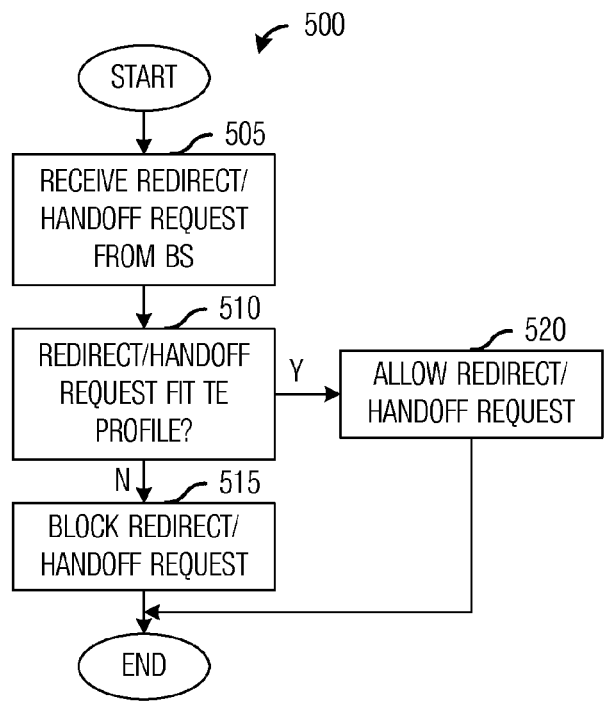
*Fig. 5*

SYSTEM AND METHOD FOR MOBILITY RESTRICTION IN WIRELESS COMMUNICATIONS SYSTEMS

This application claims the benefit of U.S. Provisional Application No. 61/077,288, filed on Jul. 1, 2008, entitled "Method and System for Mobility Restriction in Wireless Networks," which application is hereby incorporated herein by reference.

TECHNICAL FIELD

The present invention relates generally to wireless communications, and more particularly to a system and method for mobility restriction in wireless communications systems, such as Fixed Services, Mobility Services, and the like provided under a telecommunications protocol such as, e.g., WiMax protocols, also referred to as IEEE 802.16 protocols.

BACKGROUND

In a deployment of a wireless communications system, an operator (or service provider) may need (or wish) to control the mobility of terminals (also sometimes referred to as subscriber terminals, subscribers, subscriber units, mobile stations, User Equipment, and the like) that access the communications system to receive services subscribed thereto. The need to control the mobility of terminals may arise due to regulatory restrictions associated with a spectrum license granted to the operator (Fixed Service only). For example, the operator may only have a Fixed Service only license that may prohibit it from providing mobility service (Mobility Service only) to terminals that are capable of mobility. Therefore, terminals in the operator's communications may have their mobility restricted by law.

Additionally, the need to control the mobility of terminals may also be due to a commercial need to provide tiered services, e.g., wherein the operator charges different rates based on a terminal's mobility or lack thereof. For instance, a terminal of a subscriber who pays for Fixed Service may have its mobility restricted, while a terminal of a subscriber who pays for Mobility Service (typically at higher cost) may not have mobility restrictions.

A geographical area where the terminal or subscriber may receive service may normally be setup in the terminal's (or subscriber's) profile in a core system database. For Fixed Service, a terminal may be allowed to access the communications system from a single geographical area, typically a single access point (AP) (also sometimes referred to as a base station (BS), base transceiver station (BTS), and so forth), while for Nomadic Service, a terminal may be allowed to access the communications system from different geographical areas, but the service and the session may only be maintained as long as the terminal/subscriber is connected to an initial point of access. There may be scenarios however, where due to radio frequency (RF) or other adverse conditions, the communications system may need to redirect the terminal to another AP without breaking the mobility restriction requirements. Conventional methods and systems do not accommodate these needs, however.

What is needed then is a method and system for accommodating differing mobility restriction requirements for the various terminals (also sometimes referred to as subscriber units or mobile stations) that might be encountered on a wireless communications system.

SUMMARY OF THE INVENTION

These and other problems are generally solved or circumvented, and technical advantages are generally achieved, by embodiments of a system and method for mobility restriction in wireless communications systems.

In accordance with an embodiment, a method for base station operations is provided. The method includes receiving a request for service from a terminal, sending a request for authorization of the terminal to a controller, receiving in response to the request for authorization, an indication that the terminal is authorized, the indication comprises a mobility restriction classification associated with the terminal, and granting access to the terminal.

In accordance with another embodiment, a method of operating in a wireless communication system is provided. The method includes receiving a request for authorization of a terminal from a base station, querying an authentication and authorization device regarding the terminal, receiving, in response to the query, an indication that the terminal is authorized, the indication including a mobility restriction classification associated with the terminal, and sending a terminal authorized message to the base station.

In accordance with another embodiment, a method of operating in a wireless communication system is provided. The method includes receiving a redirect request for a terminal, comparing a target of the redirect request with a local redirection zone associated with the mobility restriction classification of the terminal, and processing the redirect request based on a result of the comparing. The terminal has a mobility restriction classification.

An advantage of an embodiment is that greater flexibility of the wireless communications system in handing terminals having different mobility restriction requirements is allowed.

A further advantage of an embodiment is that to terminals, the mobility restrictions are transparent. Additionally, no modifications to terminals are needed.

Yet another advantage of an embodiment is that the mobility restrictions are performed within operator communications system equipment, so security is not an issue.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which:

FIG. 3 is a flow diagram of base station operations in implementing mobility restrictions in a wireless communications system;

FIG. 4 is a flow diagram of base station controller operations in implementing mobility restrictions in a wireless communications system; and FIG. 5 is a flow diagram of base station controller operations in implementing mobility restrictions in a wireless communications system.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a WiMAX adherent wireless communications system. The invention may also be applied, however, to wireless communications system adherent to other communications standards, such as IEEE 802.16, and so forth.

Figure 1A:
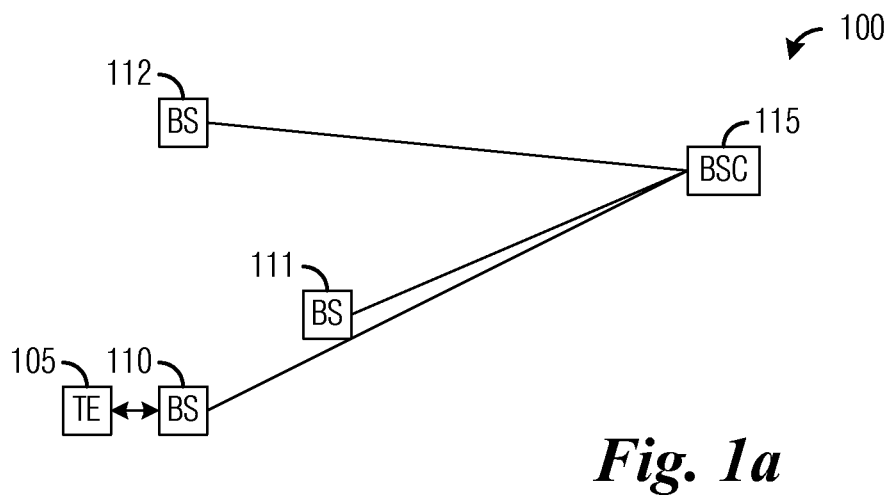
FIGS. 1a through 1c are diagrams of wireless communications systems.

FIG. 1a illustrates a wireless communications system 100. Wireless communications system 100 includes a terminal (TE), such as TE 105, a number of base stations (BS), such as BS 110, BS 111, and BS 112, and a base station controller (BSC) 115. TE 105 may be served wirelessly by BS 110, which may transmit to TE 105 as well as grant transmission opportunities to TE 105, which may transmit to BS 110 during the transmission opportunities. Communications to and from TE 105 flow through BS 110. If TE 105 initiated service in wireless communications system 100 with BS 110, then BS 110 may be referred to as an initial point of access for TE 105.

BSC 115 may be connected to the BSs and may be responsible for operations such as allocation of channels, controls handoffs, and so forth. Additionally, BSC may also serve as intermediary between the TEs and the BSs in wireless communications system 100 and other services and devices not in wireless communications system 100, such as authorization, authentication, and accounting (AAA) servers, information and data servers, multimedia servers, other wired and wireless communications systems, and so forth.

Figure 1B:
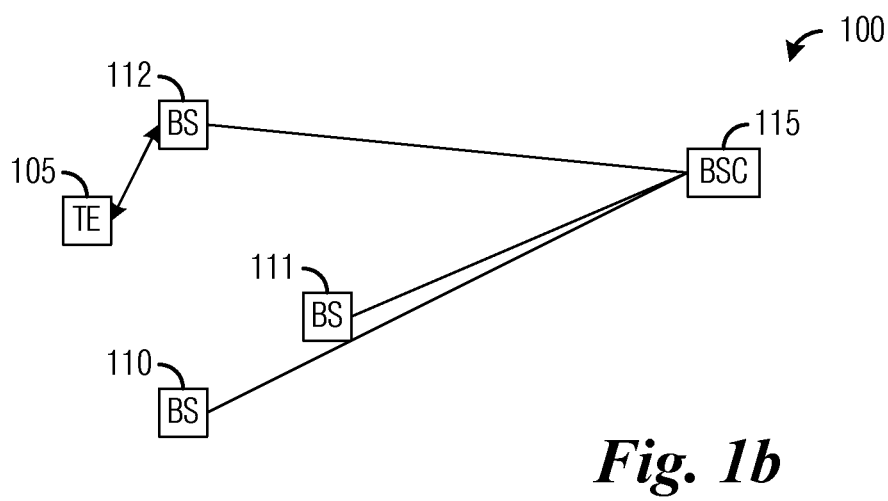

If TE 105 has Mobility Service, then as TE 105 moves around, it may move out of a service area of BS 110 and enter a service area of another BS, such as BS 112. When this occurs, a handoff may be performed and TE 105 may switch to being served by BS 112 instead of BS 110. Typically, the handoff may be initiated by BS 110, although in some wireless communications systems, TE 105 may be able to indicate that it wishes to be in a handoff. FIG. 1b illustrates wireless communications system 100 wherein TE 105 has moved into an area where it is now served by BS 112 instead of BS 110.

Figure 1C:
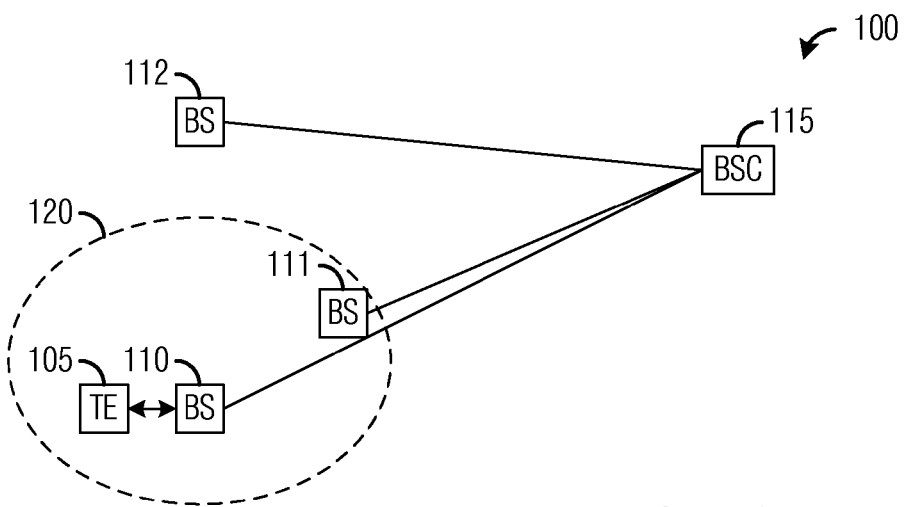

However, if TE 105 has Fixed or Nomadic Service, then TE 105 may still be able to move, but it may not be able to handoff to a different BS should it start to exit the service area of its initial point of access. Typically, TE 105 may be fixed to BS 110 (initial point of access for TE 105). However, as discussed previously, RF or other adverse conditions may force the operator to permit TE 105 to redirect (or handoff) to another BS without allowing full mobility to TE 105. For example, due to spotty coverage at its initial point of access (BS 110), in order to provide adequate performance within a given area TE 105 may be permitted to participate in a redirection with a BS immediately adjacent to BS 110, such as BS 111, if BS 111 can provide better service quality. The restricted coverage area where TE 105 may redirect may be referred to as a local redirection zone. FIG. 1c illustrates wireless communications system 100 wherein TE 105 is restricted to a local redirection zone 120 comprising BS 110 and BS 111.

A local redirection zone may be defined by an operator of a wireless communications system for each BS in the wireless communications system. The local redirection zone may be defined as a list of one or more BSs that may accept redirection from one another even if a TE participating in the redirection has Fixed or Nomadic Service. Therefore, in a situation wherein a TE is not allowed to be redirected to any BS, its local redirection zone may include only a single BS, its initial point of access. While, in situations wherein a TE is allowed to be redirected to at least one other BS, then the local redirection zone may include at least two BSs: the TE's initial point of access and one other BS. However, in situations wherein a TE has Mobility Service, then its local redirection zone may include a list of every BS in the wireless communications system or there may not be a local redirection zone at all.

A local redirection zone may be defined for a BS and may be applicable to TEs being served by the BS. Alternatively, a local redirection zone may be defined for each TE operating in the wireless communications system.

A local redirection zone may be stored in a system database accessible during normal operation of the wireless communications system. Then, as the wireless communications system is powered on, the system database may be accessed and local redirection zones for each BS in the wireless communications system may be retrieved and provided to the respective BSs.

Furthermore, to implement different levels of service, the operator of a wireless communications system may have multiple local redirection zones per BS for each of the different levels of service. For example, for Fixed Service, a BS's local redirection zone may only include the BS itself. For Mobility Service level 1, a BS's local redirection zone may only include one or two BSs, for Mobility Service level 2, a BS's local redirection zone may include a few more BSs, for Mobility Service level 3, a BS's local redirection zone may include a few additional BSs, and so forth. Finally, Full Mobility Service may have no local redirection zones or a local redirection zone that includes every BS in the wireless communications system.

During operation of the wireless communications system, as BSs are added to the wireless communications system, the system database may be updated and any changes to a BS's local redirection zone may result in an update being provided to the BS. For example, if a new BS is added to the wireless communications system near an existing BS, then the new BS may or may not be added to the existing BS's local redirection zone. If the new BS is added to the existing BS's local redirection zone, then the existing BS's local redirection zone is modified at the system database as well as at the existing BS. Similarly, if a BS is removed from service, the system database and local redirection zones of BSs impacted by the BS's removal may be updated.

Figure 2:
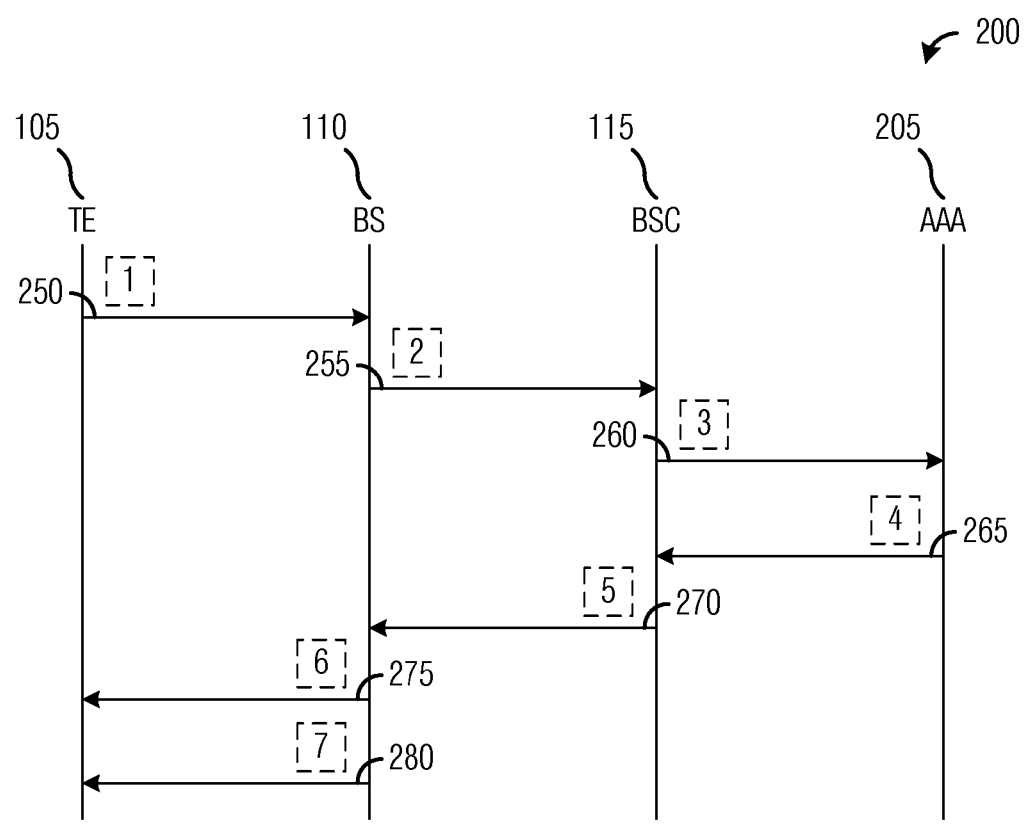
FIG. 2 is a diagram of a message exchange in implementing mobility restrictions in a wireless communications system.

FIG. 2 illustrates a message exchange in operations 200 for implementing mobility restrictions in a wireless communications system. Operations 200 may be indicative of operations taking place in a wireless communications system, such as a WiMAX compliant wireless communications system, implementing mobility restrictions on TEs operating in the wireless communications system. Operations 200 may occur each time a TE, such as TE 105, initially enters the wireless communications system or when actions of the TE results in a redirection or handoff.

Operations 200 may begin when the TE initially enters the wireless communications system. When the TE initially enters the wireless communications system, it may request service from a BS, such as BS 110, in the wireless communications system (shown as event #1 250). The TE may initially enter the wireless communications system when it is initially powered on within a coverage area of the wireless communications system, it is attempting to reestablish previously established service with the wireless communications system that has expired or otherwise terminated, it has roamed into the coverage area of the wireless communications system, and so forth.

As the BS receives the request for service from the TE, the BS may send an authorization/authentication request for the TE to a BSC, such as BSC 115 (shown as event #2 255). The authorization/authentication request sent to the BSC may include information such as the TE's identifier, the BS's identifier, and the BS's local redirection zone (if the BS has one).

The BSC may then query an AAA server (or some other authorization/authentication server), such as AAA server 205, about the TE with an authentication/authorization query (shown as event #3 260). If the authentication/authorization query is successful, i.e., the identity of the TE has been authenticated and the TE is authorized to receive service, then the AAA server may send to the BSC a subscriber profile for the TE (event #4 265). Information contained in the subscriber profile may include a classification of the TE as being a Fixed/Nomadic Service or a Mobility Service terminal. If multiple levels of Mobility Service are implemented, then the classification may include the TE's level of Mobility Service. The subscriber profile may also include the TE's priority, service data rate, and so forth.

The classification of the TE may be used to indicate if mobility restrictions are to be implemented and the local redirection zone is to be in effect. The classification of the TE may also be used to indicate if session continuity is enabled or disabled for the TE.

The BSC may indicate to the BS that the authentication/ authorization of the TE was successful (event #5 270). Depending on wireless communications system architecture, if the BS performs redirection (handoffs), then the BSC may provide the classification of the TE to the BS. If the BSC performs redirection (handoffs), then the BSC may not provide the classification of the TE to the BS. The BSC may provide other information contained in the TE's subscriber profile to the BS, including the TE's priority, service data rate, and so forth.

The BS may then complete the request for service from the TE (event #6 275). With the completion of the request for service, the TE may begin to receive transmissions as well as be granted transmission opportunities (both of which may be based on its subscriber profile). The BS becomes the TE's initial point of access.

As the TE operates in the wireless communications system, events initiated by the TE may result in a request for redirection (handoff) to a target BS. As discussed previously, the actions initiated by the TE may result in a request for redirection. However, in general, the TE cannot initiate a request for redirection by itself. A redirection controller in the BSC (or the BS depending on architecture of the wireless communications system) may compare the request for redirection with the BS's local redirection zone and may grant the request for redirection only if the target BS is in the local redirection zone. If the target BS is not in the local redirection zone of the TE's initial point of access, then the request for redirection may be rejected or blocked (event #7 280).

If the target BS is in the local redirection zone of the TE's initial point of access, then the BSC may grant the request for redirection. When the BSC grants the request for redirection, the BSC may either maintain the session or it may trigger a session reestablishment based on whether or not session continuity is enabled/disabled for the TE.

As discussed previously, the local redirection zone is obtained by the BSC from the BS in event #2 265, be preconfigured, or retrieved from a system database using an identifier of the BS.

FIG. 3 illustrates a flow diagram of BS operations 300 in implementing mobility restrictions. BS operations 300 may be indicative of operations occurring in a BS, such as BS 110, of a wireless communications system, such as wireless communications system 100. BS operations 300 may occur during normal operations of the wireless communications system as TEs, such as TE 105, initially enters the wireless communications system.

BS operations 300 may begin with the BS receiving a service request from the TE (block 305). The service request from the TE may include an identifier for the TE, which may be used to identify and authenticate/authorize the TE. The BS may send to a BSC, such as BSC 115, a TE authentication/ authorization request (block 310). In addition to including the identifier of the TE in the TE authentication/authorization request, the BS's local redirection zone may also be included. In an alternative embodiment, if the BS performs redirections, the BS may not include the local redirection zone in the TE authentication/authorization request.

The BS may then receive a TE authenticated message from the BSC (block 315). The TE authenticated message may include information such as the TE's priority, service data rate, and so forth. In an alternative embodiment where the BS performs redirection, the TE authenticated message may also include a classification of the TE (Fixed/Nomadic Service, Mobility Service, Mobility Service level, and so on), which the BS may use in limiting the TE's mobility if needed. The BS may then complete the TE service request (block 320). Once the BS completes the TE service request, the BS becomes the TE's initial point of access and BS operations 300 may terminate.

FIG. 4 illustrates a flow diagram of BSC operations 400 in implementing mobility restrictions. BSC operations 400 may be indicative of operations occurring in a BSC, such as BSC 115, of a wireless communications system, such as wireless communications system 100. BSC operations 400 may occur during normal operations of the wireless communications system as a TE, such as TE 105, initially enters the wireless communications system.

BSC operations 400 may begin with the BSC receiving a TE authentication/authorization request from a BS, such as BS 110 (block 405). The TE authentication/authorization request may be in result of a service request from the TE as it initially enters the wireless communications system. The TE authentication/authorization request includes the TE's identifying information, such as identifier. According to an embodiment, the TE authentication/authorization request may include the BS's local redirection zone for use in implementing mobility restrictions.

The BSC sends the TE authentication/authorization request to an AAA (or some other authentication/authorization) server (block 410). The TE authentication/authorization request includes the TE's identifying information. The BSC may then receive a TE authentication/authorization request granted message from the AAA server, wherein the TE authentication/authorization request may include a profile for the TE (block 415). The profile for the TE may include a classification for the TE, which may specify the mobility service, Fixed/Nomadic Service or Mobility Service, for example, of the TE. In an alternative embodiment, the profile for the TE may also include a Mobility Service level if the mobility service of the TE is Mobility Service. The BSC may then send a TE authenticated message to the BS (block 420) and BSC operations 400 may then terminate.

FIG. 5 illustrates a flow diagram of BSC operations 500 in implementing mobility restrictions. BSC operations 500 may be indicative of operations occurring in a BSC, such as BSC 115, of a wireless communications system, such as wireless communications system 100. BSC operations 500 may occur during normal operations of the wireless communications system as operations of a TE, such as TE 105, results in a redirection in the wireless communications system.

BSC operations 500 may begin with the BSC receiving a redirect (handoff) request from a BS, such as BS 110 (block 505). The redirect request may be the result of actions taken by the TE. For example, the TE may have moved around and may have caused its serving BS to initiate a redirect request as the TE begins to leave a coverage area of BS 110 and enters a coverage area of a new BS.

The BSC (a redirect controller operating within the BSC, for example) may compare the new BS with the BS's local redirect zone and the TE's profile information to determine if the redirect should be allowed to proceed (block 510). For example, the BSC may compare the new BS with a list of permissible BSs in the local redirect zone (if any). Furthermore, if Mobility Service levels are implemented, then the BSC may also make use of the TE's Mobility Service level in the TE's profile to determine a proper list of permissible BSs.

If the new BS is not in the local redirect zone, then the BSC will block the redirect request from the BS (block 515). With the redirect request blocked, the TE is forced to remain with BS 110 and if the TE continues to move away from the coverage area of BS 110, then the TE may lose service. If the new BS is in the local redirect zone, then the BSC will allow the redirect request from the BS (block 520) and the redirect will proceed. BSC operations 500 may then terminate.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A base station in a wireless communications system, the base station comprising:
   a processor; and
   a computer readable storage medium storing programming for execution by the processor, the programming including instructions to:
   receive a request for service from a terminal;
   send a request for authorization of the terminal to a controller;
   receive, from the controller in response to the request for authorization, a response message indicating that the terminal is authorized, wherein the response message comprises a mobility restriction classification indicating that the terminal is restricted to fixed or nomadic access in the wireless communications system, wherein the mobility restriction classification indicates that the terminal is restricted to fixed access when the terminal is only allowed to access the wireless communications system from a single geographical area, and wherein the mobility restriction classification indicates that the terminal is restricted to nomadic access when terminal is allowed to access the wireless communications system from multiple geographical areas, but can maintain a service only for so long as the terminal is connected to an initial point of access; and
   grant the terminal access to the wireless communications system.

2. The base station of claim 1, wherein the response message further comprises a session continuity value associated with the terminal.

3. The base station of claim 1, wherein the request for authorization comprises a local redirection zone for the base station.

4. The base station of claim 3, wherein the local redirect zone is configurable.

5. The base station of claim 3, wherein the local redirect zone comprises a list of at least one base station.

6. The base station of claim 5, wherein the mobility restriction classification comprises a Fixed Service indicator, and wherein the list comprises the base station.

7. The base station of claim 3, wherein the mobility restriction classification comprises a Mobility Service indicator, and wherein the local redirect zone lists the base station and at least one other base station.

8. The base station of claim 1, wherein the base station is part of a wireless communications system compliant with IEEE 802.16 protocols.

9. The base station of claim 8, wherein the wireless communications system is compliant with WiMAX protocols.

10. The base station of claim 1, wherein the response message further comprises a redirection zone associated with the base station, and wherein the redirection zone lists a plurality of target base stations to which the base station is permitted to handover terminals that are restricted to fixed or nomadic access.

11. A controller in a wireless communications system, the controller comprising:
    a processor; and
    a computer readable storage medium storing programming for execution by the processor, the programming including instructions to:
    receive a request for authorization of a terminal from a base station;
    query an authentication and authorization device regarding the terminal;
    receive, in response to the query, a response message from the authentication and authorization device indicating that the terminal is authorized, wherein the response message comprises a mobility restriction classification indicating that the terminal is restricted to either fixed or nomadic access in the wireless communications system, wherein the mobility restriction classification indicates that the terminal is restricted to fixed access when the terminal is only allowed to access the wireless communications system from a single geographical area, and wherein the mobility restriction classification indicates that the terminal is restricted to nomadic access when the terminal is allowed to access the wireless communications system from multiple geographical areas, but can maintain a service only for so long as the terminal is connected to an initial point of access; and send a terminal authorized message to the base station.

12. The controller of claim 11, wherein the response message further comprises a session continuity value associated with the terminal.

13. The controller of claim 11, wherein the programming further includes instructions to receive, in response to the query, an indication that the terminal is not authorized.

14. The controller of claim 11, wherein the terminal authorized message comprises the mobility restriction classification.

15. The controller of claim 11, wherein the terminal authorized message further comprises a session continuity value associated with the terminal.

16. The controller of claim 11, wherein the response message further comprises a redirection zone associated with the base station, and wherein the redirection zone lists a plurality of target base stations to which the base station is permitted to handover terminals that are restricted to fixed or nomadic access.

17. A method for controlling access to a wireless communications system, the method comprising:

receiving a request message from a base station requesting authorization of a mobile terminal; and pursuant to receiving the request message, sending a response message to the base station indicating authorization of the mobile terminal, wherein the response message comprises a mobility restriction classification associated with the mobile terminal, wherein the mobility restriction classification indicates that the mobile terminal is restricted to fixed or nomadic access in the wireless communications system, and wherein the mobility restriction classification indicates that the terminal is restricted to nomadic access when the terminal is allowed to access the wireless communications system from multiple geographical areas, but can maintain a service only for so long as the terminal is connected to an initial point of access.

18. The method of claim 17, wherein the mobility restriction classification indicates that the terminal is restricted to fixed access when the terminal is only allowed to access the wireless communications system from a single geographical area.

19. The method of claim 17, wherein the response message further comprises a redirection zone associated with the base station, and wherein the redirection zone lists a plurality of target base stations to which the base station is permitted to handover the mobile terminal in the event that a handover is warranted.

* * * * *